UNITED STATES PATENT OFFICE.

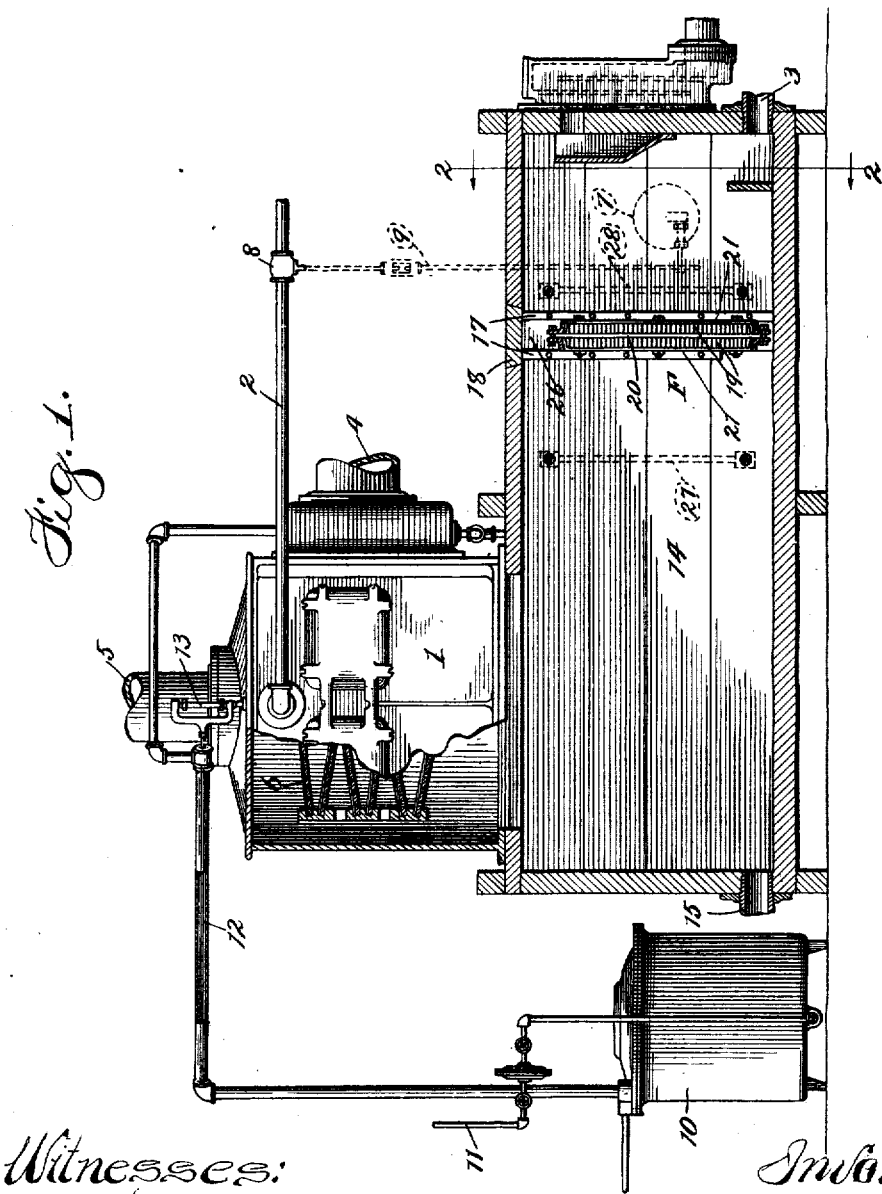

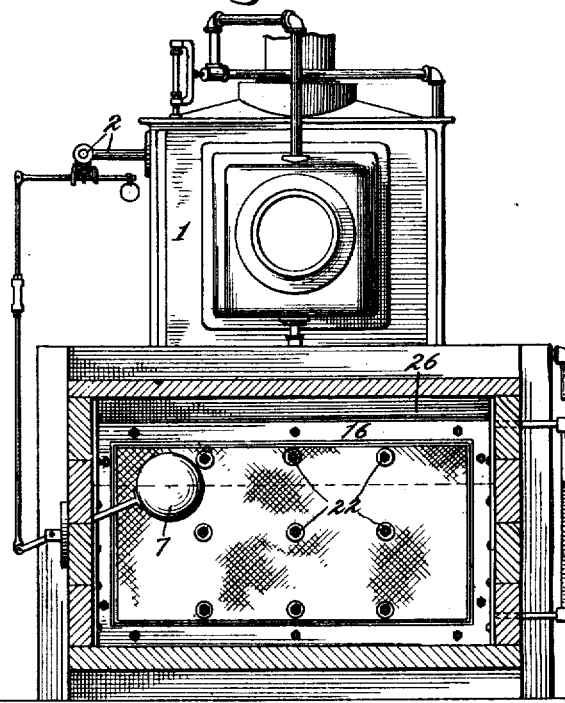
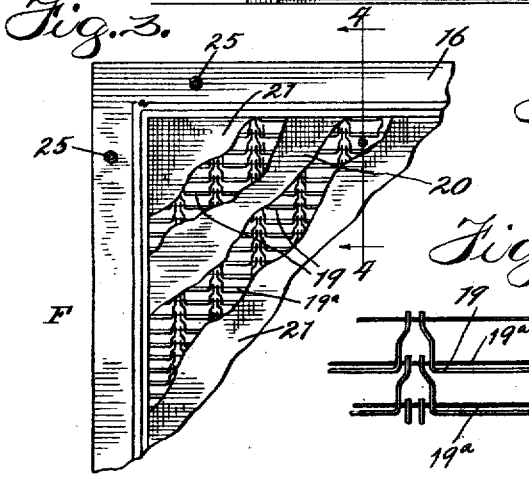
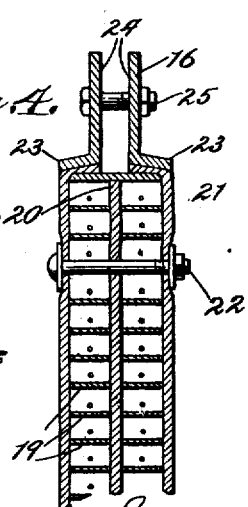

ADOLPH SORGE, JR., OF CHICAGO, ILLINOIS.

WATER-PURIFYING APPARATUS.

No. 902,847.  Specification of Letters Patent.  Patented Nov. 3, 1908.

Application filed April 7, 1905. Serial No. 254,271.

*To all whom it may concern:*

Be it known that I, ADOLPH SORGE, Jr., a citizen of the United States, and a resident of Chicago, in the county of Cook and State of Illinois, have invented certain new and useful Improvements in Water-Purifying Apparatus, of which the following is a specification.

This invention relates to improvements in that class of water purifying apparatus comprising an "open" heater, in which the impurities that it is desired to be rid of are brought down or collected by the chemical action of reagents supplied for the purpose, and are then removed from the water by filtration, as shown, for example, by my Patent No. 683,349, of Sept. 24, 1901.

The object of the present invention is to improve such apparatus in respect to the construction and location of its filter bed, to render such filter bed capable of being readily removed and altered or adapted to meet the filtration requirements of various qualities of feed water, to provide, without excessive cost, for a settling chamber within which a large portion of the impurities precipitated from the feed water may be collected before the water reaches the filter, to provide an emergency outlet which will enable the water to flow past the filter and escape to the boilers without substantial interruption, even if the filter becomes clogged, and generally to provide a simple and improved form of apparatus capable of being supplied in large units at a minimum of cost.

In the accompanying drawings,—Figure 1 is a side elevation, partly in section, of a hot water purifying apparatus constructed in accordance with my improvements in one form. Fig. 2 is a sectional end elevation thereof taken on line 2—2 of Fig. 1. Figs 3, 4 and 5 are details of the filter construction.

In said drawings, 1 designates a feed water heater of the open type or variety; 2 a supply pipe which discharges the feed water into the upper end of said heater; 3 the outlet pipe leading from the heater to the boilers (not herein illustrated), and 4 and 5 the inlet and exhaust pipes through which the steam from the engine is supplied to and conducted from the heater. The latter may be of any usual or desired construction, it being herein shown as provided at its upper portion with a series of inclined trays 6, upon the uppermost one of which the cold feed-water entering through the supply pipe 2 is discharged to flow in a shallow stream over the succeeding lower trays, subject to the heating influence of the surrounding atmosphere of exhaust-steam, until it finally falls from the lowermost tray in a heated condition and collects in the lower portion of the heater, ready to be drawn off through the outlet pipe 3, leading to the boilers. A suitable float 7 controlling a valve 8 in the water supply pipe, through appropriate intermediate connections 9, is provided to regulate the admission of feed water in accordance with the rate at which it is drawn off to the boilers.

The chemical treatment of the feed-water is herein shown as accomplished by means of a chemical-tank 10, in which the desired reagent is placed and which is supplied with water under pressure from a suitable source, conveniently through a connection 11, leading from the supply-pipe 2. The water entering through this connection becomes impregnated with the reagent and is then discharged back into the feed-water through a pipe 12, in which a sight-feed 13 is provided to enable its flow to be visually regulated. The impurities precipitated from the feed-water by this chemical treatment are then removed from the water by filtration.

In general the apparatus thus far described is similar to that disclosed in my Patent No. 683,349, of Sept. 24, 1901, hereinbefore referred to, and the details of its construction have in themselves no particular relation to the present improvements, except as hereinafter particularly pointed out. Of these improvements, one feature consists in arranging the filter bed F in a vertical position, preferably at one end of the lower portion or base 14 of the heater, which lower portion or base is herein shown as made in the form of an elongated vat or tank, that can be structurally separate from the upper portion of the heater 1 and may be built of wood and of large capacity at a minimum of cost. With the filter thus arranged in a vertical position, that portion of the vat or tank on the inner or heater side of the filter becomes, in effect, a settling chamber wherein a great portion of the precipitates thrown down from the feed water will collect without ever reaching the filter. And the vertical arrangement of the filter, furthermore, tends to cause the layer of precipitates collecting upon the filter bed to scale off from time to time and fall back into the settling chamber. Such arrangement, therefore, operates directly to retard and minimize the clogging of the filter bed (which clogging, as is well known, is one of the great drawbacks to purifying apparatus of this character), and it not only renders the cleaning of the filter less frequently necessary, but greatly facilitates cleaning operations by reason of the tendency of the precipitates to fall downwardly away from the bed by gravity, especially when loosened by the action of a jet of water from a hose. The precipitates collecting in the settling chamber, and falling from the filter bed, as suggested, may be removed in any suitable manner, as by washing them out through a discharge pipe 15.

The vertical position of the filter bed F also lends itself to a readily removable construction which is of great convenience in permitting the filter to be altered and adapted to most advantageously handle the peculiar character of feed water which is to be passed through it in any particular case. Thus the precipitates of one quality of feed water may be satisfactorily removed by filter blankets alone. Others may require a filter bed of quartz, and for still others filter beds of still different materials and characteristics may be preferable. To enable any of these requirements to be readily met, the filter bed in the present improvement is made in the shape of a rectangular frame work 16, which is removably supported between vertical guide ways 17 on the inner sides of the lower or tank portion 14 of the heater. A section 18 of the top of this tank portion is made removable to permit the filter frame 16 to be slipped in and out of its guideways at will, and in order to substitute one construction of filter bed for another, it is, therefore, only necessary to lift one filter frame out of the tank and insert another such frame in its place. Or the same filter frame, when lifted out of the tank, may be renewed or altered to suit the conditions in hand, and then dropped back into place with but little loss of time.

As herein shown such filter frame 16 is made up of a rectangular marginal frame which incloses a species of open work grating 19 forming the foundation of the filter bed. This grating may be of any suitable construction, and is herein shown as made up, like a steel door mat, of two layers of sheet metal strips (of galvanized iron, for example), of which the strips of each layer are bent or fastened together in such manner as to afford a multiplicity of cells or openings adapted to be packed full of quartz, excelsior, or other filter material, if so desired. As herein shown these strips are bent into the shapes illustrated in Fig. 5, and are connected by pivot rods 19$^a$ so that each entire grating may be rolled up into small compass for packing and shipment. A filter blanket 20 is herein shown as inserted between the sections of the double grating 19 thus provided, while other blankets 21 are placed over the outer faces of the double gratings which may then be secured together by an appropriate number of through bolts 22. To lock these outer blankets in place and hold the gratings securely within the marginal rectangular frame, the latter is herein shown as also made double (Fig. 4) and as laterally flanged, as at 23, along the inner edge of each of its sections 24. The edges of the outer blankets 21 are then turned inwardly around the edges of the gratings and beneath the flanges 23, and the latter are drawn together by clamping bolts 25 applied between the sections 24. The flanges 23 are somewhat inwardly inclined toward their outer lateral edges and consequently exert a wedge-like action upon the flanges when drawn together, with the result that the blankets are securely clamped around the gratings while the latter are securely held within the marginal frame, as desired.

Another feature of the present improvements consists in providing an overflow passage around the filter so that in case the filter becomes clogged to such an extent as to prevent a sufficient flow of the feed water through the filter to the boiler, the water will rise back of the filter until it overflows into the discharge end of the tank, from which the boiler feed pipe leads, with the result that a full supply to the boilers will be maintained, notwithstanding the clogging of the filter. In case of such overflow the water passing to the boilers will, of course, be unfiltered water, but this is an emergency condition less detrimental than the total cutting off of the feed water supply might be. In the improved construction herein shown and in which the filter bed is arranged vertically, as described, such overflow is provided for by arranging the upper edge of the filter frame 16 somewhat below the top of the tank, thus leaving a space 26 through which the water may flow in case the filter becomes clogged, the filter bed, in such case, simply acting as a dam against which the water rises until it can flow over as described. It will, however, be understood that such an overflow, operating to substantially the same end, may be provided in connection with filter beds which are not arranged vertically, with similar beneficial results. In connection with such overflow, also, and no matter how the filter bed is arranged, it is necessary to locate the float 7 which controls the valve 8 in the water supply pipe 2, on the outside of the filter bed or at the discharge end of the tank in which the filter bed is located. The said float then serves to control the admission of feed water to the heater in accordance with the demands of consumption, and not in accordance with the rate at which the water is filtered, as is the case where the float is located on the inner side of the filter. Thus when on the outer side of the filter, the float serves to maintain the normal level of water in the discharge end of the tank, and if by reason of the clogging of the filter this water level tends to lower, the descent of the float immediately opens the valve 8 wider and increases the supply of water until either the flow of water through the filter is sufficiently increased by reason of the greater filter surface exposed and the increased pressure of water against the filter, or until the water rises on the inner side of the filter to a point where it flows past the filter through the overflow passage, as described, the full supply of feed water to the boiler being thus obviously maintained in either case without regard to the condition of the filter.

To enable the condition of the filter with respect to its ability to pass water through it, to be readily determined at any time, it is further contemplated that two gage glasses 27 and 28 will be provided on the tank 14, one on the inner and the other on the outer side of the filter. An abnormal amount of clogging of the filter will then be indicated by an excessive difference in the water levels indicated by the two gage glasses, and if the water rises high enough on the inner side of the filter to flow over the top of the heater, the gage glass 27 on this side of the filter will render the fact obvious at a glance, and will call the engineer's attention to the fact that the filter needs cleaning. The use of two gage glasses, placed one on each side of the filter bed in a purifying apparatus of the character under consideration, is not, however, herein shown or claimed *per se* as a part of the present improvements, it having already been made the subject matter of my Patent No. 860,702, granted to me July 23, 1907.

One of the advantages of the filter construction herein described is the ease with which it can be renewed, altered, or repaired. Both the filter blankets and the cellular metallic gratings may be removed or replaced at short notice, and are capable of being rolled up into small compass for shipment. And where an additional filtering material, such as quartz, or the like, is also desired, it may be readily filled into the cells of the metallic grating before the filter blankets are in place, and may be as readily removed therefrom and replaced by new quartz or by whatever substitute material may be considered preferable.

I claim as my invention:—

1. In a water purifying apparatus, the combination with an open heater, of means for supplying a chemical re-agent thereto to precipitate the impurities in the water, a settling tank connected with the heater, a filter bed through which the water normally flows in escaping from the settling tank and an overflow passage leading past the filter bed and having unobstructed communication with the outlet, substantially as described.

2. A water purifying apparatus, comprising an open heater, means for supplying a chemical re-agent thereto to precipitate the impurities in the water, a settling tank connected with the heater, and a vertically arranged filter bed through which the water from the tank normally flows, the upper edge of said filter bed terminating below the top of the tank so as to afford an overflow, and an open channel leading from the outlet side of the filter and overflow, substantially as described.

3. A water purifying apparatus, comprising an open heater, means for supplying a chemical reagent thereto to precipitate the impurities in the water, a tank connected with the heater, a filter bed through which the water in the tank is discharged, an overflow passage leading past the filter bed to the outlet, and a float controlled valve maintaining a normal water level in the outlet end of the tank tending to produce a constant volume of discharge through the outlet, substantially as described.

4. A water purifying apparatus comprising an open heater, means for supplying a chemical reagent thereto to precipitate the impurities in the water, a settling tank connected with the heater, a vertically arranged filter bed through which the water from the tank normally flows and the upper edge of which terminates below the top of the tank to afford an over-flow through which the water may pass to the outlet on occasions, and a float controlled valve for maintaining a normal water level in the outlet end of the tank tending to produce a constant volume of discharge from the tank, substantially as described.

5. A filter bed for open heaters comprising an inclosing frame, a flexible cellular grating fitting within the inclosing frame to receive filter material, and pervious septa secured within the frame against the grating, substantially as described.

6. A filter bed comprising an inclosing frame consisting of two laterally supported sections connected by clamping bolts, a cellular grating fitted within the inclosing frame adapted to receive filter material, and filter blankets secured within the frame on opposite sides of the grating with their edges turned in and secured by the clamping together of the inclosing frame sections, substantially as described.

In testimony, that I claim the foregoing as my invention, I affix my signature in presence of two subscribing witnesses, this 31st day of March, A. D. 1905.

A. SORGE, Jr.

Witnesses:
HENRY W. CARTER,
K. A. COSTELLO.